(12) United States Patent
Patzelt et al.

(10) Patent No.: US 6,918,760 B2
(45) Date of Patent: Jul. 19, 2005

(54) SHAFT PRE-HEATER

(75) Inventors: Norbert Patzelt, Beckum (DE); Thomas Schmitz, Oelde (DE); Uwe Schuh, Hamm (DE); Wolfgang Schwab, Duisburg (DE); Joachim Kudras, Kamen (DE); Tölke Heinz, Oelde (DE)

(73) Assignee: Polysius AG, Beckum (DE)

( * ) Notice: Subject to any disclaimer, the term of this patent is extended or adjusted under 35 U.S.C. 154(b) by 46 days.

(21) Appl. No.: 10/362,177

(22) PCT Filed: Jul. 18, 2002

(86) PCT No.: PCT/EP02/08028
§ 371 (c)(1),
(2), (4) Date: Feb. 19, 2003

(87) PCT Pub. No.: WO03/008888
PCT Pub. Date: Jan. 30, 2003

(65) Prior Publication Data
US 2004/0099658 A1 May 27, 2004

(30) Foreign Application Priority Data
Jul. 18, 2001 (DE) .......................... 101 34 857

(51) Int. Cl.[7] .............................. F27D 1/08
(52) U.S. Cl. ......................... 432/97; 266/197
(58) Field of Search ............................. 432/95, 96, 97, 432/101; 266/197

(56) References Cited

U.S. PATENT DOCUMENTS

| | | | | |
|---|---|---|---|---|
| 3,889,393 A | * | 6/1975 | Thomas et al. | 34/167 |
| 4,217,092 A | * | 8/1980 | Quittkat et al. | 432/14 |
| 4,243,379 A | * | 1/1981 | Horn et al. | 432/14 |
| 5,915,959 A | * | 6/1999 | Gardner | 432/98 |

* cited by examiner

Primary Examiner—Gregory Wilson
(74) Attorney, Agent, or Firm—Muramatsu & Associates

(57) ABSTRACT

A shaft preheater to achieve an improved adaptation of layer height to particle size spectrum of material to be preheated. The shaft preheater includes a plurality of shafts for receiving lumpy material, an arrangement for filling the individual shafts with the lumpy material to be preheated and means for limiting the layer height in the shafts. The means for limiting the layer height include a needle valve and have an arrangement for coarse adjustment and an arrangement for fine adjustments.

8 Claims, 3 Drawing Sheets

SHAFT PRE-HEATER

FIELD OF THE INVENTION

The invention relates to a shaft preheater with a plurality of shafts for receiving lumpy material, an arrangement for filling the individual shafts with the lumpy material to be preheated and also means for limiting the layer height in the shafts.

BACKGROUND OF THE INVENTION

Particularly in the calcination of materials in large lumps, such as for example limestone, dolomite or magnesite, with a feed particle size between 15–60 mm, rotary kilns are frequently used. In order to increase efficiency, shaft preheaters are often disposed upstream of these rotary kilns. Preheating and partial calcination of the lumpy material takes place in the shaft preheater using the exhaust gases from the rotary kiln. For an efficient heat exchange and in order to maintain an economical pressure loss there must be a good throughflow of the granular mass of material. Therefore the ratio between maximum and minimum fragment size of the feed particles is limited to 1:3. Thus for example a particle size spectrum of 15–45 mm or 20–60 mm can be treated in the shaft preheater. However, a greater particle size spectrum occurs in quarrying, so that the kiln system is operated correspondingly in stages.

In order to ensure a good throughflow of the granular mass of material it is necessary to adapt the layer height to the particle size spectrum of the material to be preheated. Thus a coarser particle size spectrum makes possible a greater layer height than a smaller particle size spectrum of the material to be preheated.

Therefore in order to process different particle size spectra it is known to provide means for limiting the layer height in the shafts. For example, it is known in the art for the covers of all shafts to be adjusted in height in order thereby to limit the layer height.

However, these known means for limiting the layer height are very expensive and, moreover, always only one particle size spectrum can be processed in the shaft preheater.

A shaft preheater which consists of kiln feed shafts disposed polygonally around a gas inlet shaft is known from DE-B-27 48 670. Each kiln feed shaft can have its own layer height control independently of the others.

SUMMARY OF THE INVENTION

The object of the invention is to improve the shaft preheater in such a way that it makes possible an improved adaptation of the layer height to the particle size spectrum of the material to be preheated.

The shaft preheater according to the invention includes a plurality of shafts for receiving lumpy material, an arrangement for filling the individual shafts with the lumpy material to be preheated and also means for limiting the layer height in the shafts, the means being constructed in such a way that a separate adjustment of the layer height is provided at least in some shafts. The means for limiting the layer height have an arrangement for coarse adjustment and an arrangement for fine adjustment of the layer height.

If the arrangement for fine adjustment of the layer height is formed by a needle valve, this can be actuated during the operation of the shaft preheater in order to adapt the layer height.

In a preferred embodiment separate means for limiting the layer height are provided in all shafts.

According to one embodiment the means for limiting the layer height comprise a slide plate which can be introduced, particularly from above, into the corresponding shaft and of which the lower edge serves for limiting the layer height.

The shaft preheater has in a manner which is known per se means for introducing a hot gas stream into the shafts as well as means for drawing off the hot gas stream which is led through the material layer into the individual shafts. In a particular embodiment of the invention, moreover, a measuring device is provided within a shaft in order to determine the pressure loss of the hot gas stream, the means for limiting the layer height being controllable as a function of the pressure loss.

BRIEF DESCRIPTION OF THE DRAWINGS

Further advantages and embodiments of the invention are explained in greater detail with reference to the following description of an embodiment and the drawings, in which.

DETAILED DESCRIPTION OF THE INVENTION

Figure 1:
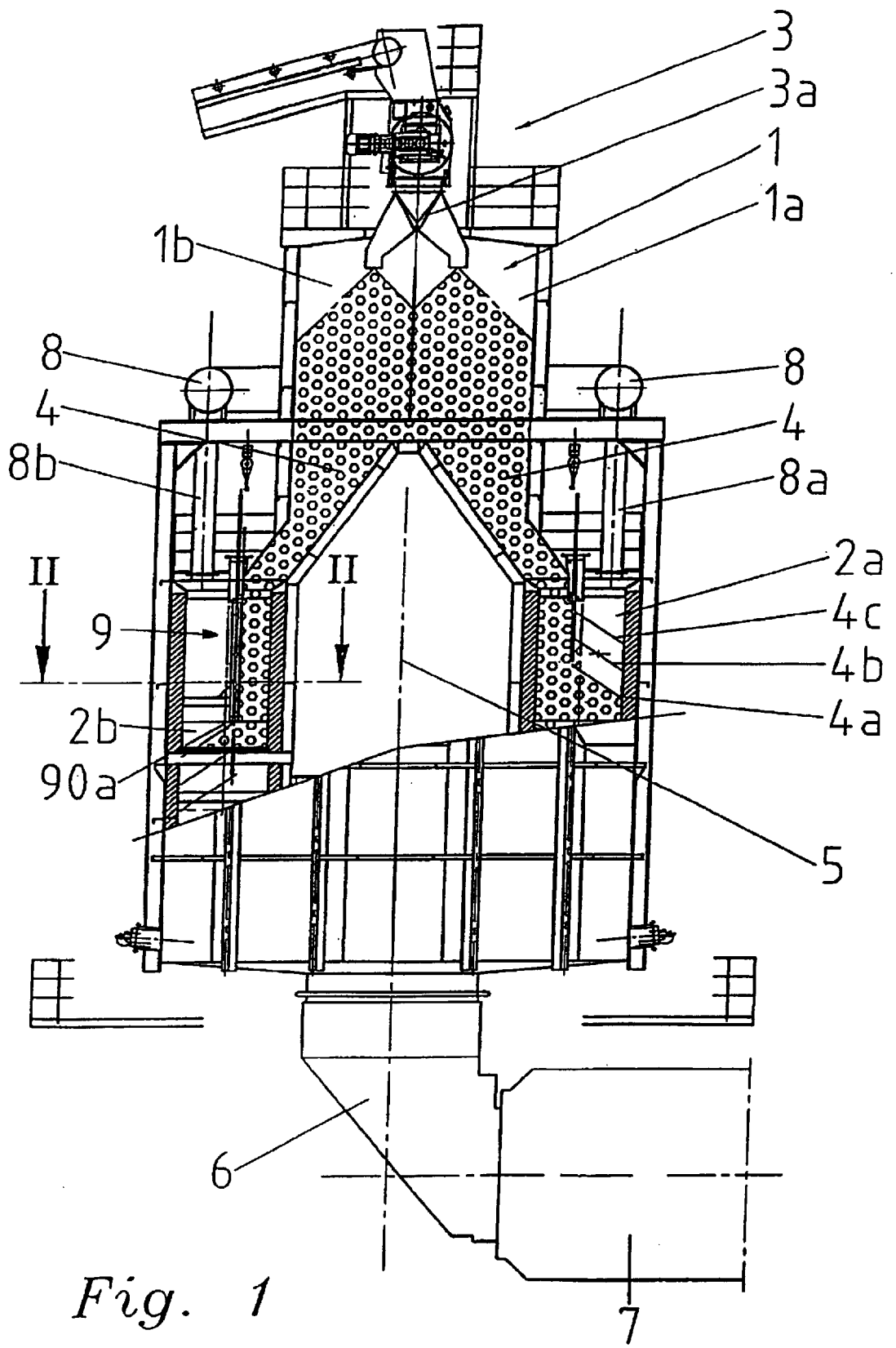
FIG. 1 shows a schematic longitudinal sectional view of the shaft preheater.

The shaft preheater consists essentially of a feed bin 1 which is divided into a plurality of sectors 1a, 1b, . . . which are each adjoined below by one of a plurality of shafts 2a, 2b, The individual shafts are filled via the feed bin with the lumpy material 4 which is to be preheated.

The feed bin 1 is divided symmetrically or asymmetrically into individual sectors according to the number of particle size spectra occurring. In the case of asymmetric division, the filling arrangement 3 is formed for example by a swivelling chute. If only two different particle size spectra are to be treated, then a symmetrical division of the feed bin 1 would be appropriate. The feeding then takes place alternately via a changeover valve 3a. The distribution in the feed bin 1 to the individual shafts 2a, 2b, . . . takes place using the natural angle of repose of the slope.

The preheating and optionally partial calcination of the lumpy material takes place in the individual shafts 2a, 2b, . . . which are disposed around a central axis 5 of the shaft preheater. In principle there can be any number of individual shafts, but there are usually between six and twenty shafts. The lumpy material 4 which is preheated in the shaft preheater proceeds via an inlet housing 6 into a rotary kiln 7. For this purpose discharge means, for example in the form of rams, are provided in the lower region of the shafts. The flue gases from the rotary kiln are drawn upwards from below through the individual shafts 2a, 2b in counter-current flow to the material 4 and thus through the granular mass of material. Therefore suitable means are provided in the lower region of the individual shafts in order to introduce into the individual shafts 2a, 2b the flue gases led out of the rotary kiln 7 via the inlet housing 6. The hot gas stream formed by the flue gas heats the lumpy material located in the shafts and is drawn off in the upper region of the shafts via means 8. The means 8 are formed by suitable ducts 8a, 8b which open into the upper region of the shafts 2a, 2b.

Since different particle size spectra have correspondingly different pressure losses and heat transfers, it is necessary to adapt the layer height in the individual shafts to the particle size spectrum located therein. For this purpose at least some, and preferably all of the shafts have means 9 for limiting the layer height, wherein a separate adjustment of the layer height in these shafts is possible.

Figure 3:
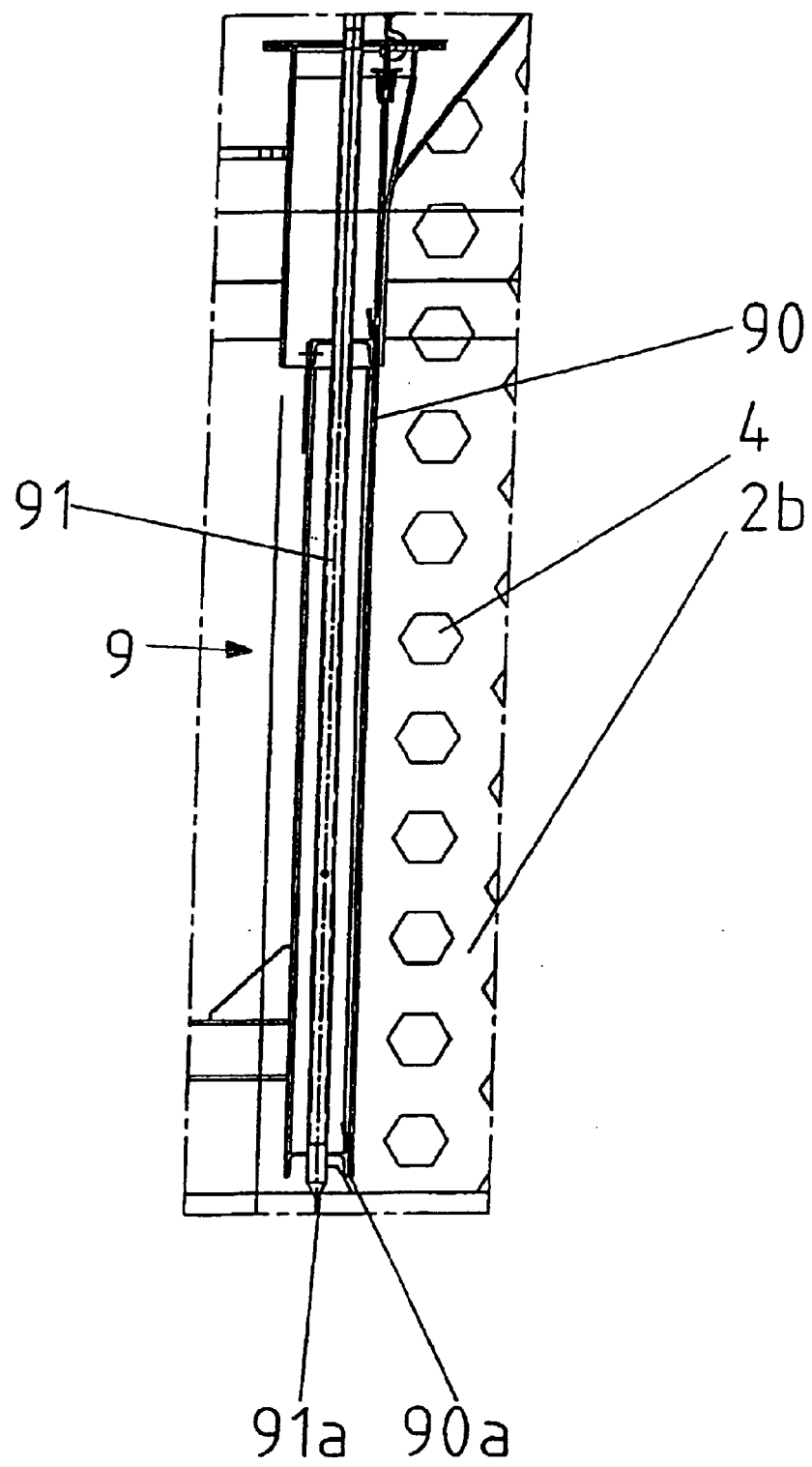
FIG. 3 shows an enlarged partial view of FIG. 1 in the region of a shaft.

FIG. 3 shows an enlarged representation of the shaft 2b in the region of the means 9 for limiting the layer height. The means 9 consists essentially of an arrangement 90 for coarse adjustment and an arrangement 91 for fine adjustment of the layer height. The means 90 for limiting the layer height are formed in the illustrated embodiment by a slide plate which can be introduced from above into the shaft 2b and of which the lower edge 90a serves for limiting the layer height. The slide plate can be displaced in the vertical direction by a mechanism which is not shown in greater detail.

Figure 2:
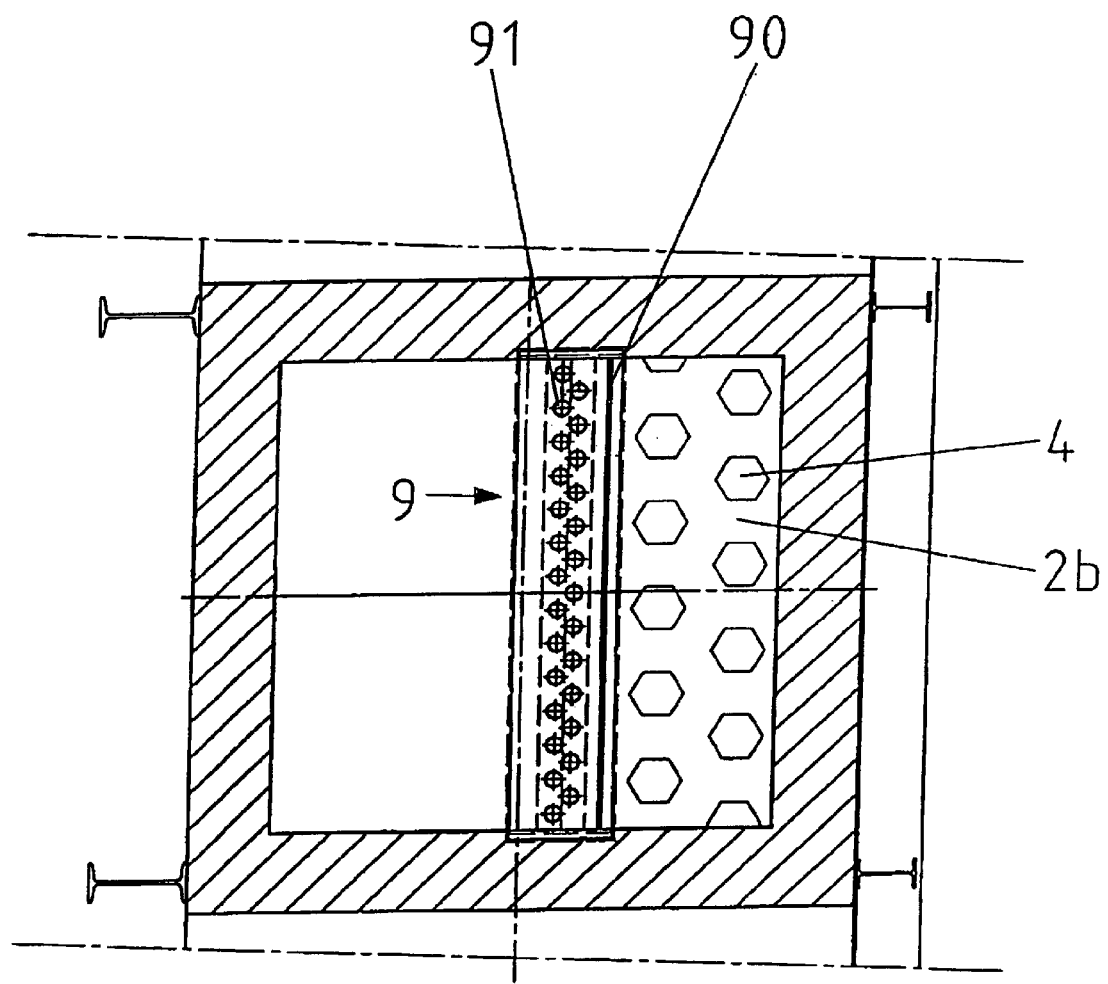
FIG. 2 shows a sectional view along the line II—II in FIG. 1.

In the illustrated embodiment the means 91 are formed by a needle valve having a plurality of rods which are disposed in two rows offset with respect to one another, as can be seen in particular from FIG. 2.

FIG. 2 also shows that the shaft 2b has a rectangular cross-section, particularly a square cross-section. The means 90, 91 for limiting the layer height are disposed so that they delimit more than half, preferably approximately a third of the shaft, the lumpy material 4 being delivered via this delimited region of the shaft. Thus the lumpy material 4 has the full cross-section of the shaft 2a available only from the lower edge 90a of the slide plate or the lower edge 91a of the needle valve 91. Below these lower edges the lumpy material 4 will distribute itself according to the natural angle of the slope surface. In the shaft 2a of FIG. 1 three slope surfaces denoted by the reference numerals 4a, 4b and 4c are shown which can form at different positions of the layer height limiting means 9.

The slide plate 90 which serves for coarse adjustment of the layer height is identified by computer and adjusted before the preheater is put into operation. The needle valve 91 which serves for fine adjustment of the layer height, the rods of which are tapered at the lower end, can also be adjusted during operation so that fine adjustment is possible in accordance with the actually occurring pressure loss. In this way it is possible to achieve a uniform throughflow of gas over the entire preheater even when different particle size spectra and thus different layer heights must be set in the individual shafts.

A measuring device for determining the pressure loss of the hot gas stream within the shaft is advantageously associated with each shaft. The means 9 for limiting the layer height are then controlled as a function of the pressure loss.

The hot gas stream which is formed by the flue gas from the rotary kiln and flows upwards from below through the individual shafts takes the path of least resistance in the region of the layer height limiting device 9 and thus leaves the granular mass of material in the region of the inclined slope surfaces which have been produced below the lower edges of the layer height limiting device 9. The hot gas stream is then drawn off via the discharge means 8.

The layer height limiting device 9 is designed so that introduction of the slide plates 9 can be dispensed with if the preheater is operated with the coarsest particle size spectrum.

What is claimed is:

1. A shaft preheater, comprising:

a plurality of shafts for receiving lumpy material;

an arrangement for filling the individual shafts with the lumpy material to be preheated; and means for limiting the layer height in the shafts, said means being constructed, in such a way that a separate adjustment of the layer height is provided at least in some shafts;

said means for limiting the layer height include a needle valve and have an arrangement for coarse adjustment of the layer height and an arrangement for fine adjustment of the layer height.

2. A shaft preheater as claimed in claim 1, wherein separate means for limiting the layer height are provided in all shafts.

3. A shaft preheater as claimed in claim 1, further comprising a feed bin through which the individual shafts are filled with lumpy material, the feed bin being divided into individual sectors.

4. A shaft preheater as claimed in claim 1, wherein said means for limiting the layer height comprise a slide plate.

5. A shaft preheater as claimed in claim 1, wherein said means for limiting the layer height comprise a slide plate which can be introduced from above into the corresponding shaft and of which the lower edge serves for limiting the layer height.

6. A shaft preheater as claimed in claim 1, wherein said needle valve can be actuated during operation of the shaft preheater.

7. A shaft preheater as claimed in claim 1, further comprising:

means for introducing a hot gas stream into the shafts; and means for drawing off the hot gas stream led through the material layer into the individual shafts.

8. A shaft preheater as claimed in claim 1, further comprising:

means for introducing a hot gas stream into the shafts;

means for drawing off the hot gas stream led through the material layer into the individual shafts; and a measuring device for determining the pressure loss of the hot gas stream provided within the shaft;

wherein the means for limiting the layer height are controllable as a function of the pressure loss.

* * * * *